(12) United States Patent
Davidson et al.

(10) Patent No.: US 11,922,559 B2
(45) Date of Patent: Mar. 5, 2024

(54) SYSTEM AND METHOD FOR PRINTED INK DENSITY COMPENSATION

(71) Applicants: John Davidson, Etobicoke (CA); Neil Compson, Kingston (CA)

(72) Inventors: John Davidson, Etobicoke (CA); Neil Compson, Kingston (CA)

(*) Notice: Subject to any disclaimer, the term of this patent is extended or adjusted under 35 U.S.C. 154(b) by 118 days.

(21) Appl. No.: 17/670,630

(22) Filed: Feb. 14, 2022

(65) Prior Publication Data
US 2023/0260196 A1 Aug. 17, 2023

(51) Int. Cl.
| | |
|---|---|
| *G06T 15/08* | (2011.01) |
| *B29C 64/393* | (2017.01) |
| *B33Y 50/02* | (2015.01) |
| *G06T 7/90* | (2017.01) |

(52) U.S. Cl.
CPC ............ *G06T 15/08* (2013.01); *B29C 64/393* (2017.08); *G06T 7/90* (2017.01); *B33Y 50/02* (2014.12)

(58) Field of Classification Search
CPC .......... G06T 15/08; G06T 7/90; G06T 19/00; B29C 64/393; B29C 37/00; B33Y 50/02
See application file for complete search history.

(56) References Cited

U.S. PATENT DOCUMENTS

| | | | |
|---|---|---|---|
| 7,555,157 B2 | 6/2009 | Davidson | |
| 11,288,862 B2 * | 3/2022 | Davidson | ............... G06T 17/10 |

\* cited by examiner

*Primary Examiner* — Jeffery A Brier
(74) *Attorney, Agent, or Firm* — Elias Borges

(57) ABSTRACT

Herein is disclosed a method for ink or coating density compensation by means of applying calculated additional ink/coating to the pre-decorated substrate or film, and by additionally, if needed, apply colour-correction to pre-decoration print files to compensate for higher-than-desired ink density colour shifts. The method includes the steps of providing a flat polymer web having a uniform grid pattern of grid markers printed thereon, and then thermally transforming the web to form a three-dimensional target grid. The target grid is then digitized and the change in the spacing of the grid markers is measured and recorded. The recorded transformed spacing for each grid marker is then used to modify the initial graphics file to compensate for ink-density irregularities resulting from the shrinking and stretching deformations of the substrate during thermal transformation.

11 Claims, 7 Drawing Sheets

SYSTEM AND METHOD FOR PRINTED INK DENSITY COMPENSATION

CROSS REFERENCE TO RELATED APPLICATION

This application is a continuation-in-part of application Ser. No. 16/945,346 entitled "Improved System and Method for Transforming Graphical Images" the entirety of which is incorporated herein by reference.

FIELD OF THE INVENTION

The invention relates generally to methods and systems for the creation of data and graphical images to compensate and correct for ink density problems that occur when a pre-decorated two-dimensional substrate is formed into a three-dimensional shape.

BACKGROUND OF THE INVENTION

Many production processes involve forming or molding a three-dimensional part from a two-dimensional web or sheet. For example, plastic thermoforming, metal stamping, and metal cold forming involve forming a three-dimensional part from a sheet of a substrate material through the use of vacuum and/or pressure that conforms the web to a mold or die. Blow molding involves the use of air pressure to shape a parison comprising a substrate material inside a mold. Other production processes in which a three-dimensional part is formed from a two-dimensional web include pressing, stretch forming, shrink forming, and shrink wrapping. In addition, in-mold decoration and insert-mold decoration are processes related to the molding of a three-dimensional part wherein the part is molded and decorated simultaneously.

Those of skill in the art will appreciate that the two-dimensional web used in these processes may undergo complex changes during production. For example, consider a thermoforming process using a thermoplastic web. Prior to thermoforming, the plastic web is flat and has a substantially uniform thickness. During thermoforming, the heated plastic web stretches as it is formed. In most cases, the topographic die used in thermoforming is colder than the heated plastic sheet substrate (web). As a result, when the plastic substrate makes contact with the mold, it "freezes off" at that point and ceases stretching. Other areas of the plastic substrate not yet in contact with the mold continue to stretch. The effect is a potentially large variation in thickness and relative stretch of the substrate as it comes into contact with the mold. Another example would be the complex transformation that occurs when a thin substrate undergoes shrink-wrap conversion. As a result, when the substrate is shrunk in a heat tunnel or similar, the substrate will undergo a shrink in surface area making the printed ink more dense, and also stretch in areas depending on the topography, shape and relief of what is being wrapped, thus making the printed ink less dense.

Shrinking or stretching in areas of the material being formed or shrunk causes substrate itself and/or the pre-decorated ink, coating or other form of imprint to increase or decrease in density which will lighten, darken or colour-shift the perceivable ink and/or substrate to an undesired degree.

Therefore, it would be advantageous in producing a 3D part having a desired image upon it to adjust the desired image before printing it onto the substrate such that the image after the substrate undergoes 3D deformation remains close to the desired image despite portions of the substrate being stretched or shrunk.

SUMMARY OF THE INVENTION

In accordance with one aspect of the present invention, there is provided a method for ink, coating or other density compensation by means of applying calculated additional ink, coating or other to the pre-decorated substrate or film, and by additionally, if needed, apply colour-correction to pre-decoration print files to compensate for higher-than-desired ink density colour shifts. The method includes the steps of providing a flat polymer web having a grid pattern printed thereon, the grid pattern comprising a uniform spacing of grid markers, each grid marker separated from each other by a space, the polymer web being formed of a thermally transformable polymer. The flat polymer web is then thermally transformed into the three-dimension part to form a target grid. The three-dimensional shape of the target grid is then digitized to form a geometric model as a series of data points that are digital representatives of the grid markers of the target grid. After this, measuring and recording a transformed spacing for each grid marker in the target grid takes place by comparing the transformed spacing of each grid marker in the target grid to the size of said grid marker in the uniform spacing of the original printed and unformed web used to form the target grid. The transformed spacing for each grid marker is then represented as a percentage of colour and applying the resulting percentage of colors to the digitized model as a mapped texture graphic. The next step is to create a two-dimensional distorted mask that visually represents the differences in spacing of the grid markers between the target grid and the uniform spacing from the mapped texture graphic. Finally, the mapped texture graphic is applied to the initial graphics file for print so that in the final formed substrate more dark ink is printed where ink thinning is occurring and more light ink is printed where ink compression is occurring, thus compensating for ink-density irregularities.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
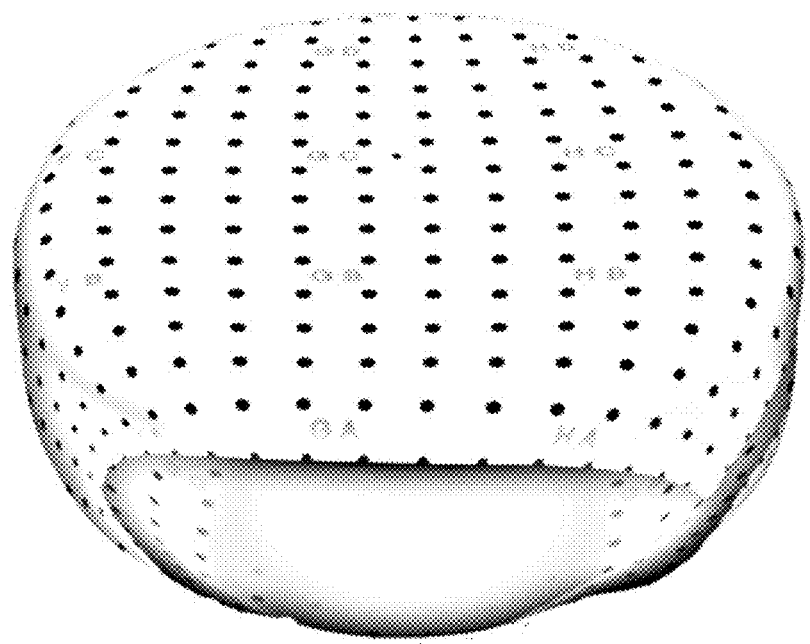
FIG. 1 is a shows a simulated printed and shrunk/formed grid film.

The principle goal of the present invention is to produce 3D parts having an image (or coating) applied thereto which is uniform in terms of shading and color intensity. This is achieved by modifying an image before applying the image to the substrate by means of stretch and shrink analysis, graphical image application, and data cross-referencing. When a pre-decorated plastic sheet is formed to high relief and there are areas of the formed sheet that become thin to the point that the ink or coating in that area has a less than desired density, an additional layer of ink or coating can be applied to the substrate before it is formed in order to compensate for the low ink density in the effected areas. Conversely, areas of a formed substrate that exhibit high shrink areas and thus cause ink/coating density to increase beyond a desired level, graphical images and colour compensation calculations can be added to the printing and forming process to compensate for the undesired high ink/coating density.

In order to facilitate compensation for ink-density fluctuations on a pre-decorated 2D substrate sheet (web), the present invention provides a method of producing printable images to solve ink-density thinning and thickening; and data that can be used to cross reference with a printer's ink-density calibrations and help to determine colour-correction calculations.

Data is collected by printing a grid on a substrate and then forming the 3D part from the printed substrate. The grid is of a known and consistent grid square spacing. The spacing of each grid square on the formed grid is then measured and compared to the original, pre-formed grid square dimensions. The change in the grid square spacing is used in calculating how the coating density of the original image must be modified to compensate for the patterns of stretching and shrinking measured.

It will be appreciated that each thermoplastic substrate upon which the grid squares are printed will be substantially identical, but the deformation process itself may be slightly inconsistent from substrate to substrate. As a result, the resulting pattern of deformation in the spacing of the grid squares on the transformed grids will vary slightly from transformed part to transformed part. To maximize the accuracy of the measurements and data used in the present invention, it may be desirable to take measurements from a target grid which is as representative as possible of the median deformation process experienced by all of the printed substrates. Co-pending application Ser. No. 16/945,346 entitled "Improved System and Method for Transforming Graphical Images" discloses a good method of selecting a target grid by measuring the pattern of deformation of each of a plurality of deformed thermoplastic plates and then selecting a transformed plate whose pattern of deformation is measured to be closest to the center of variance of the deformed plates. Preferably, the method of the present invention is practiced using a target grid selected using the method disclosed in the above referenced application, the entirety of which is incorporated herein by reference.

The measurements of the formed grid can be made in a number of ways, namely, by physically measuring, or by digitizing the grid information through a wide variety of digitizing processes, i.e. photogrammetry and laser scanning. A digitized formed grid file, used in a 3D object manipulation software program, helps to automate the measuring process as the measurements can be made and outputted to a digital file for later reference and processing of ink and colour adjustments to be made by a printer (FIG. 7, as explained in the 'Ink Density Distortion Compensation—Sample Shrink-Wrap Implementation' section below).

Figure 2:
FIG. 2 is an example ink density compensation mask file or printable layer.

Once a formed grid is digitized, it can also be used to generate a graphical representation of what stretch or shrink is occurring in the formed grid. Those of skill in the art of 3D object manipulation can appreciate that many 3D software have the analysis tools and ability to visually represent, with different colors, the variations in distances between an object's vertices. For the purposes of the present invention, a graphics file is created in the 3D software by outputting the colors created by the analysis of the grid spacing, called a 'Mask File' (FIG. 2). The positioning of the stretch and shrink of the part, as represented by different colors, are distorted so that the representative colors of stretch and shrink exist in their appropriate positions for when they are printed on a flat sheet and then formed. The graphic 'mask' file can be utilized in graphic design software (such as Adobe Illustrator and Adobe Photoshop) to a colour print layer or to a graphics file with the intended graphic elements for print and is built such that when printed the areas of the formed part that require darkening (stretch occurring) have more ink than areas that do not require darkening (not stretching) (FIG. 4, as explained in the 'Ink Density Distortion Compensation—Sample Thermoforming Implementation' section below).

Ink Density Distortion Compensation—Sample Thermoforming Implementation

Thermoformed parts with high amount of draw, and particularly parts that are intended to be back-lit, will often exhibit ink thinning. With back-lighting combined with deep draw and fully printed graphics, undesirable 'halos' appear when the back light shines through too strongly in areas where the substrate, and printed ink attached to it, is thinned.

Due to ink thinning caused by substrate and ink stretch, areas that are intended to be seen as black become gray, especially when back-lit. An 'ink mask' can be added to the printing process by adding a black or dark gray layer of printed ink to darken the thinning areas. For these types of 'ink mask' applications, no tonal colour shifts in graphic colours are occurring, just darkening areas and increasing opacity by adding black ink to areas that thin and let the light through too much.

An 'ink mask' can be used to not just apply more black/opacity but to influence a shade of a certain colour, for example a part that has a dark brown area that becomes a lighter, red-brown tone when ink thinning occurs, can have a colour-shifted darker brown ink applied when printing to produce the desired, consistent shade of brown when formed. So an ink mask can be used to darken the ink in a thinning area of the part and also influence the shade and tone of a formed ink colour.

Similarly, shrinking in formed substrate will exhibit an increase in ink density and consequently make for a darkening effect in tone or shade in the shrunk areas. If an area of a formed part exhibits shrinking in areas that is significant enough to increase density of the ink, then layers of white ink or colour-shifted ink can be used to lighten the printed substrate and compensate for the darkening effect.

An 'ink mask' can be introduced to the printing process for the purposes of density compensation using standard methods that are utilized in pre-press operations. A mask can be added to a print layer in Adobe Photoshop or Adobe Illustrator to designate the areas of print that are in need of additional ink, for example, the mask layer shown in FIG. 2 can be applied to the print layer of the art file (shown in FIG. 3) to produce graphics that, when printed, will add ink in the desired areas (FIG. 4).

Ink Density Distortion Compensation—Sample Shrink-Wrap Implementation

After a grid graphics file is printed and formed/shrunk, shrink/stretch data is collected through a digitizing process or with manual measurements for analysis. FIG. 1 shows a simulated grid film that is shrunk and ready to be used for analysis/measuring.

An ink density compensation map, or 'ink mask' graphic file is created using the measured grid spacing in comparison to the original grid spacing. If a grid square is larger than originally the area of the graphic file will need darkening, if a grid square is smaller than it was originally it will need lightening. The shrink or stretch percentage values that are gleaned from measuring the grid squares and comparing them to the sizes of the original grid squares, will afford a shade or colour-shift value to that particular grid square. The multitude of grid squares is then blurred to achieve smooth transitions from one grid square to another by means that those skilled in the art will appreciate as standard graphics manipulation. The resulting 'mask' image being similar in structure to a mask file created using the above described method of outputting a distorted image from a 3D software program using analysis tools and distortion techniques.

FIG. 2 demonstrates an example of an ink density mask layer that is added to the print graphics file in order to compensate for ink density fluctuations due to forming. The darker areas of the ink density mask layer show where the most shrink is occurring. The Density map file is used to compensate for ink density stretch and/or compression by applying it to the printed graphic file. In this example, the ink density mask lightens the areas of the graphic file where the film is shrinking the most (the darker areas shown in FIG. 2).

Figure 3:
FIG. 3 is a sample graphics file for print.
Figure 4:
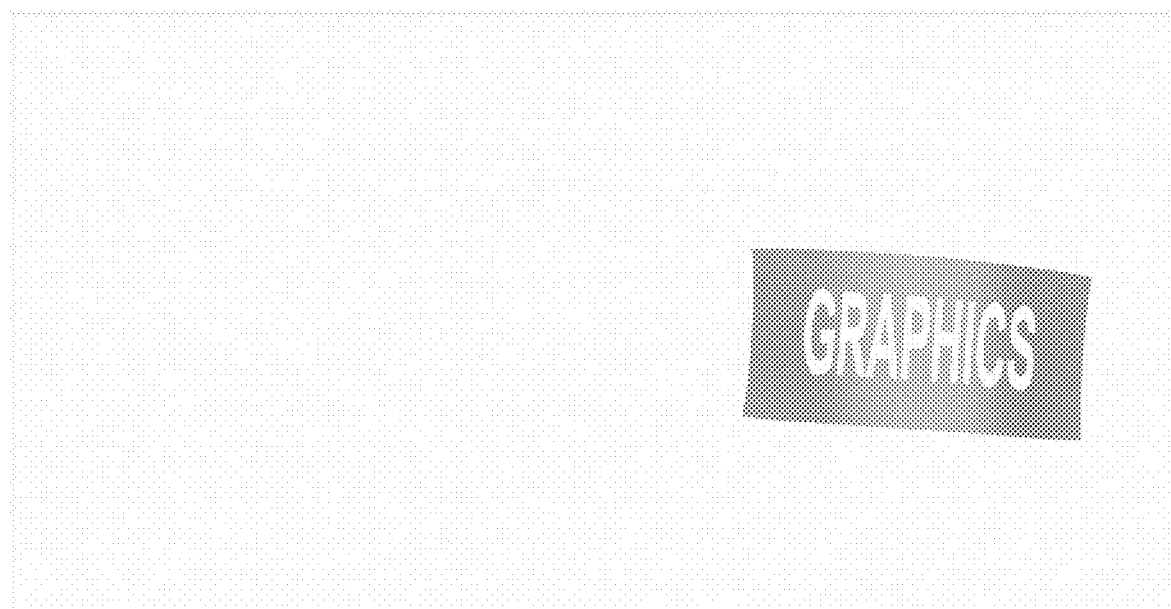
FIG. 4 is a sample graphics file for print combined with an ink density compensation mask.
Figure 5:
FIG. 5 is an image of the final product implementing the ink density mask

FIG. 3 shows a graphics file for print, there is a 50% gray area surrounding the 'GRAPHICS' text. FIG. 4 is a graphics file for print with the density compensation mask applied so that the areas of most shrink are lightened to compensate for ink density compression. The result is an even 50% gray when the final file is printed and shrunk. FIG. 5 is a simulation of the final product that demonstrates the resulting consistent 50% gray area surrounding the 'GRAPHICS' text as a result of implementing the ink density mask.

Figure 6:
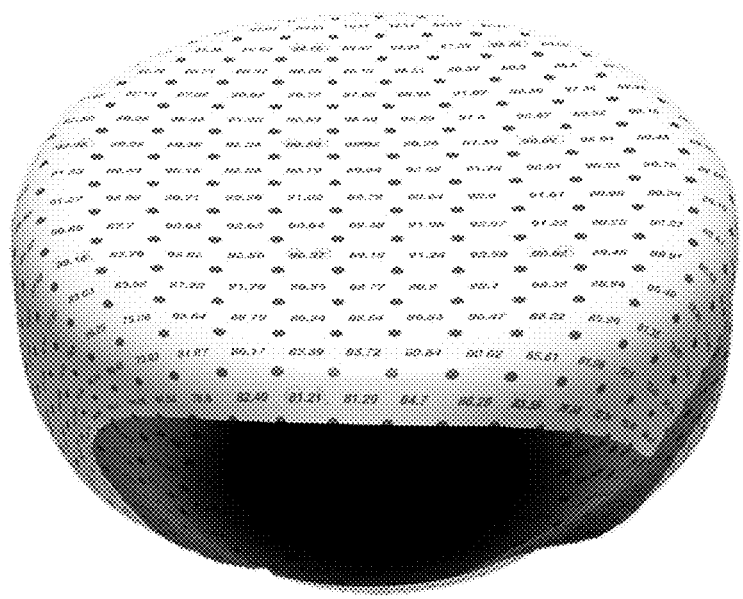
FIG. 6 is a 3D simulation showing the data of the stretch and shrink percentage data after being measured.

For added precision and to afford the ability to use additional print data as a means of compensating for ink thinning and colour-shifting, shrink/stretch data is also collected and formatted for ink density analysis purposes. FIG. 6 shows in a 3D simulation the result of the stretch and shrink percentage data being measured. The data that is collected consists of horizontal, vertical and combined shrink/stretch percentages. The data is measured and formatted to be added to the original grid and art graphics file.

Figures 7, 8:
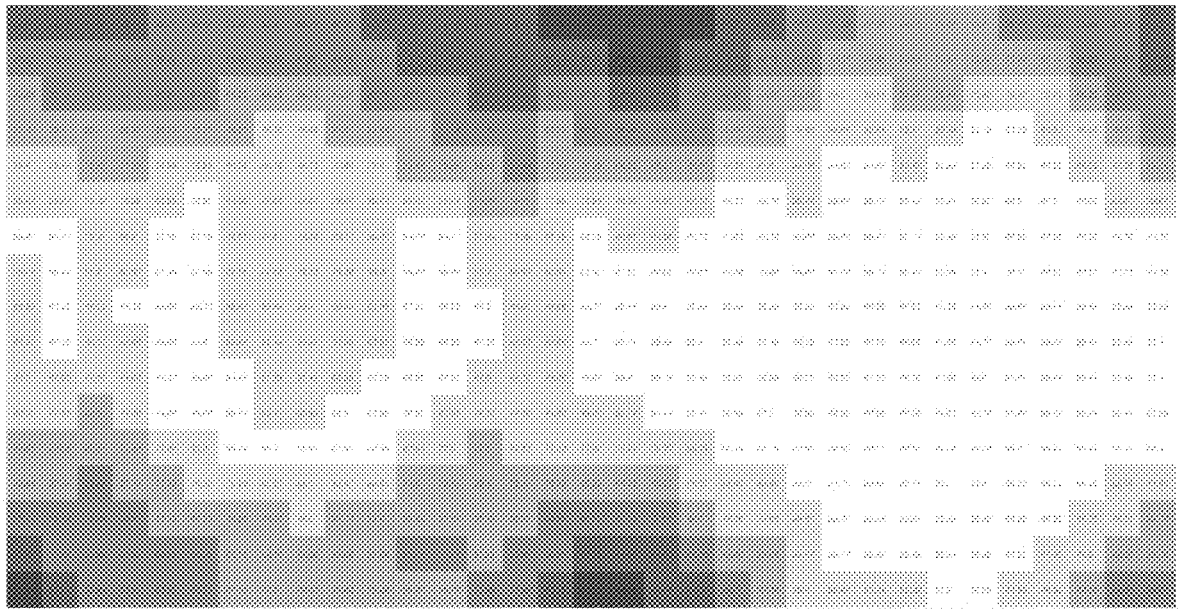
FIG. 7 is the shrink/stretch data imported in to a graphics file.
FIG. 8 is a representation of grid square percentiles converted to grayscale amounts.
Figure 9:
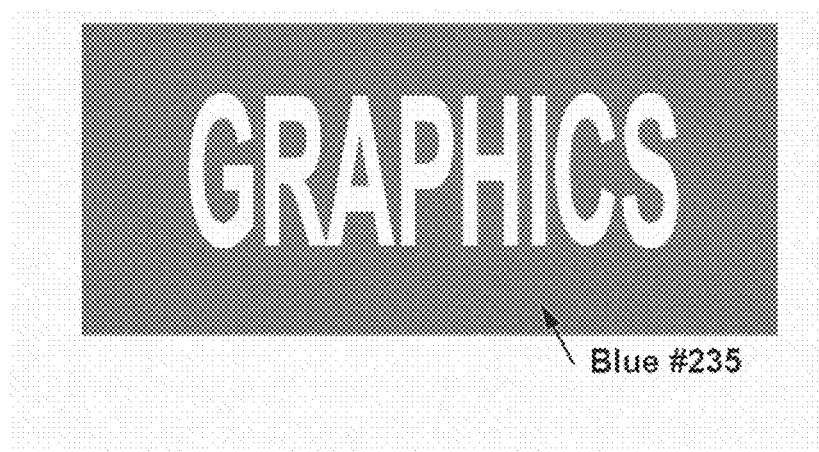
FIG. 9 is a graphics file with a note of the intended print colour.

Accumulated data is formatted to coincide geographically with the printed film/sheet. FIG. 7 shows the shrink/stretch data imported in to a graphics file. The percentage numbers in each grid square are the measured percentages of the formed substrate. The percentage numbers are converted to a grayscale percentage resulting in an image with each grid square assigned a gray colour percentage. FIG. 8 demonstrates the conversion of grid square percentiles to grayscale amount and shows regions of the print that are within certain predefined percentage brackets. The regions, and their shrink/stretch percentage brackets show data that is more generalized so that compensation to ink density can be applied to art elements within a large area. The white area on the right hand side shows a shrink region on the top of the shrunk film that averages a shrink percentage of 89%.

All of the shrink data, regional data and compensation mask information is compiled in to a file that includes the original grid graphics and distorted art, all as separate layers. The compiled file is called the IDDC file (Ink Density Distortion Compensation file).

The IDDC file is sent to the printer/colour operator to cross-reference the percentage numbers and regions with ink colour and density readings. The printer/colour operator obtains ink colour and density data readings through standard practices such as using densitometers, spectrophotometers, colormeters and employing any findings from print production testing or profiling that where ink density can be measured, such as the examination of a printed and formed flood print or fingerprint layout.

Figure 10:
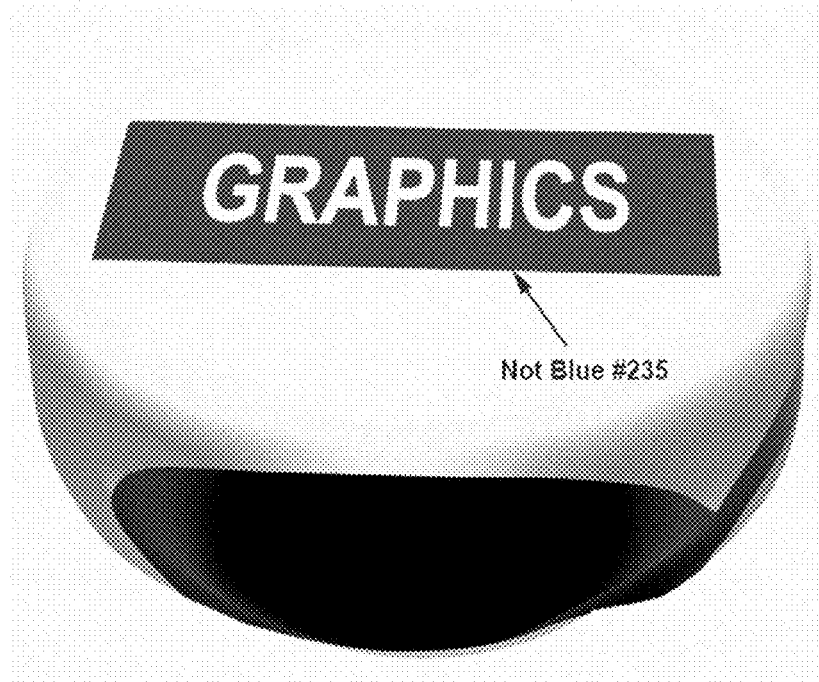
FIG. 10 is a simulated demonstration of a shift in colour tone when material is shrunk.
Figure 11:
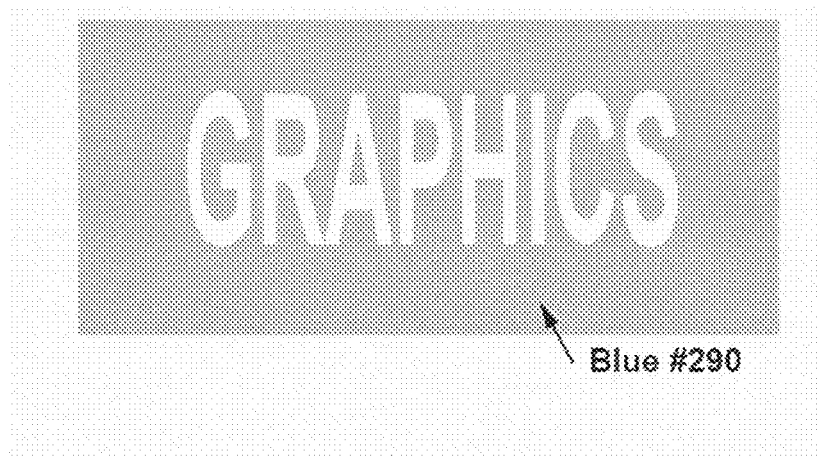
FIG. 11 is a graphics file with a note of a substitute colour for printing.
Figure 12:
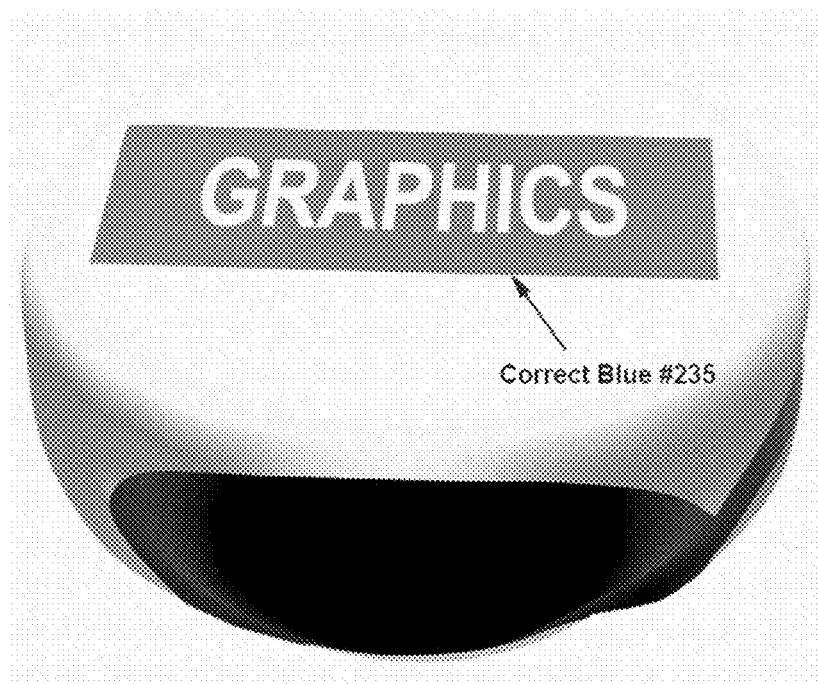
FIG. 12 is a simulated demonstration of a shrunk print material with a note signalling the desired colour tone.

For example, the final product is to have a certain shade and tone of blue in the graphics: 'Blue #235'. When printed and shrunk, this blue become a darker shade and tone (simulated graphics file and simulated final shrunk product is shown in FIG. 10). The printer/colour operator can correlate the data in the IDDC file with colour and ink density readings from the shrunk grid or test sample. Once the data correlation is complete, a new blue colour is determined (see FIG. 11). The new blue colour is applied to the art elements and when printed and shrunk it shifts to the desired blue colour (simulated final shrunk product shown in FIG. 12).

Figure 13:
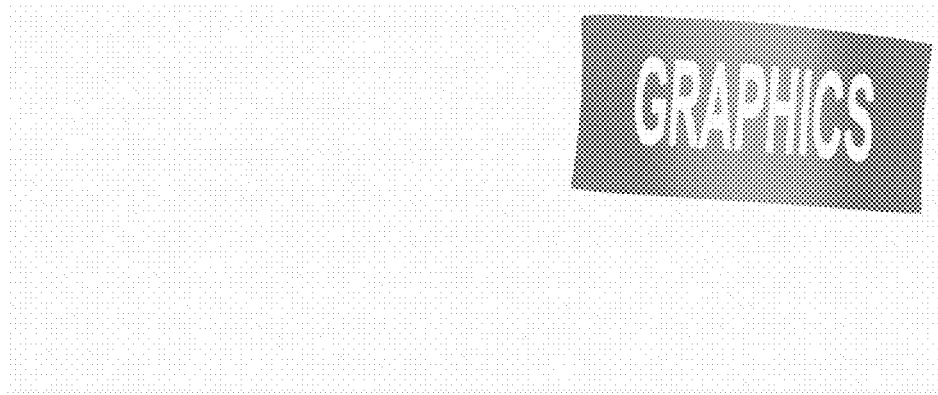
FIG. 13 is a graphics file that utilizes regional colour shift compensation through the use of a density mask.
Figure 14:
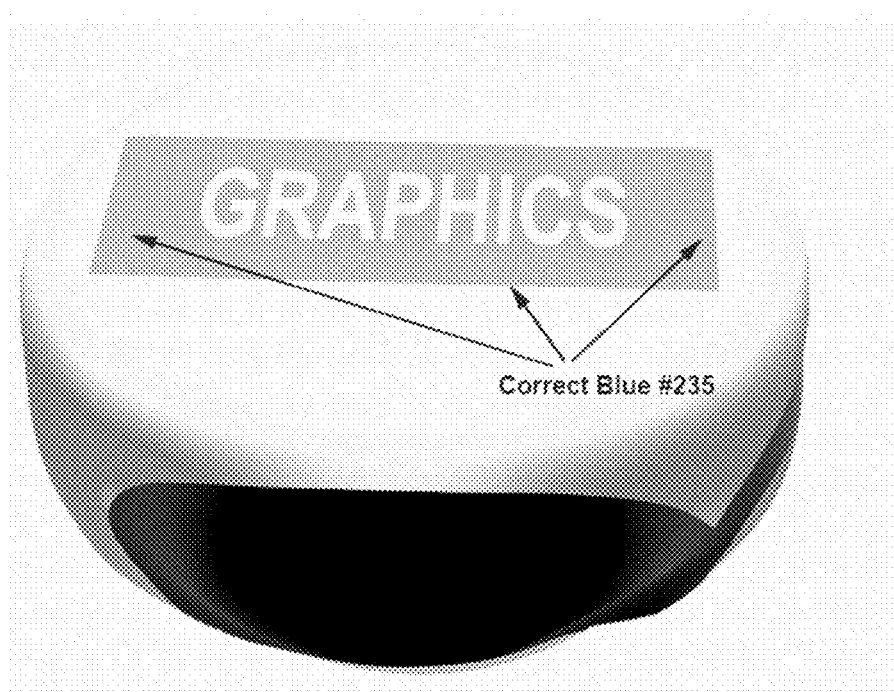
FIG. 14 is a simulated demonstration of the desired final formed graphic file with a note describing the correct colour in different regions.

Refer to FIG. 13. If added precision is desired (and shrink/forming variance permits), the ink density map (or 'ink mask') can be combined with the colour/density data compensation. The middle of the graphics area is shrinking more than the left and right edge areas, and when the compensating ink mask is applied to the elements in the art layers, it lightens the colour in the middle to compensate and to achieve a consistent blue tone and shade when shrunk, as demonstrated in FIG. 14.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A method for deforming an initial graphics file of an image to compensate and correct for ink and coating density problems that occur when a substrate upon which the image is printed is formed into a three-dimensional part, the method comprising the steps of:
   providing a plurality of flat polymer webs each having a grid pattern printed thereon, the grid pattern comprising a uniform spacing of grid markers, each grid marker separated from each other by a space, the polymer webs each being formed of a thermally transformable polymer;

thermally transforming each of the polymer webs into the three-dimension part;

selecting a suitably representative sample of the grid markers common to each polymer web for comparison;

measuring and recording a position for each grid marker in the representative sample of grid markers for each thermally transformed polymer web;

comparing the representative sample of grid markers from each of the polymer webs and selecting a single target grid from the plurality of transformed polymer webs, the target grid being selected by identifying the transformed polymer web whose grid markers in the representative sample reside closest to a center of variance of the positions of the grid markers in the representative sample of all of the transformed polymer webs;

digitizing the three-dimensional shape of the target grid to form a geometric model as a series of data points that are digital representatives of the grid markers of the target grid;

measuring and recording a transformed spacing for each grid marker in the target grid by comparing the transformed spacing of each grid marker in the target grid to the size of said grid marker in the uniform spacing of the original printed and unformed web used to form the target grid;

representing the transformed spacing for each grid marker as a percentage of colour and applying the resulting percentage of colors to the digitized model as a mapped texture graphic;

creating a two-dimensional distorted mask that visually represents the differences in spacing of the grid markers between the target grid and the uniform spacing from the mapped texture graphic;

applying the mapped texture graphic to the initial graphics file for print so that in the final formed substrate more dark ink is printed where ink thinning is occurring and more light ink is printed where ink compression is occurring, thus compensating for ink-density irregularities.

2. A method for deforming an initial graphics file of an image to compensate and correct for ink and coating density problems that occur when a substrate upon which the image is printed is formed into a three-dimensional part, the method comprising the steps of:

providing a flat polymer web having a grid pattern printed thereon, the grid pattern comprising a uniform spacing of grid markers, each grid marker separated from each other by a space, the polymer web being formed of a thermally transformable polymer;

thermally transforming the polymer web into the three-dimension part to form a target grid;

digitizing the three-dimensional shape of the target grid to form a geometric model as a series of data points that are digital representatives of the grid markers of the target grid;

measuring and recording a transformed spacing for each grid marker in the target grid by comparing the transformed spacing of each grid marker in the target grid to the size of said grid marker in the uniform spacing of the original printed and unformed web used to form the target grid;

representing the transformed spacing for each grid marker as a percentage of colour and applying the resulting percentage of colors to the digitized model as a mapped texture graphic;

creating a two-dimensional distorted mask that visually represents the differences in spacing of the grid markers between the target grid and the uniform spacing from the mapped texture graphic;

applying the mapped texture graphic to the initial graphics file for print so that in the final formed substrate more dark ink is printed where ink thinning is occurring and more light ink is printed where ink compression is occurring, thus compensating for ink-density irregularities.

3. The method of claim 2 wherein stretch and shrink calculations are utilized to pre-adjust tonal colour-shifts of ink that occur after forming substrate into a three-dimensional part.

4. The method of claim 2 wherein the grid pattern further comprises a uniform array of unique identifiers overlapping the uniform array of grid markers, each unique identifier separated by four to five grid markers.

5. The method of claim 2 wherein the transformed spacing calculations are converted to shade and colour variations represented in a two-dimensional graphic file for print.

6. The method of claim 2 wherein calculations and related graphical representations of calculations are cross-referenced with printer calibrations, colour and tone shift observations, calculations and studies.

7. A method of claim 2 wherein the method of compensation for thinning or thickening of printed ink is likewise applied to compensate for the effects of thinning and thickening of a coating applied to the substrate.

8. The method of claim 7 further comprising the step of physically measuring the grid spacing of a formed part and compiling resulting measurements ratios to their original sizes.

9. The method of claim 7 further comprising the step of measuring the grid spacing of a digitized version of the physically formed part and compiling measurement ratios to their original sizes.

10. A method of claim 2 wherein the method of compensation for thinning or thickening of printed ink is likewise applied to compensate for the effects of thinning or thickening of a film applied to the substrate.

11. The method of claim 2 further comprising the step of creating a measurements database representing shrink and stretch characteristics of the three-dimensional formed polymer web substrate.

\* \* \* \* \*